(12) United States Patent
Hu et al.

(10) Patent No.: US 10,333,694 B1
(45) Date of Patent: Jun. 25, 2019

(54) SYSTEMS AND METHODS FOR SECURE SMART CONTRACT EXECUTION VIA READ-ONLY DISTRIBUTED LEDGER

(71) Applicant: Accelor Ltd., George Town, Grand Cayman (KY)

(72) Inventors: Shiwen Hu, Sunnyvale, CA (US);
Xiaohan Ma, Santa Clara, CA (US);
Guojun Chu, Saratoga, CA (US)

(73) Assignee: Accelor Ltd., George Town, Grand Cayman (KY)

(*) Notice: Subject to any disclaimer, the term of this patent is extended or adjusted under 35 U.S.C. 154(b) by 0 days.

(21) Appl. No.: 16/160,161

(22) Filed: Oct. 15, 2018

(51) Int. Cl.
| | |
|---|---|
| *H04L 9/00* | (2006.01) |
| *H04L 29/06* | (2006.01) |
| *H04L 9/06* | (2006.01) |
| *H04L 29/08* | (2006.01) |
| *G06F 16/18* | (2019.01) |
| *G06F 21/71* | (2013.01) |

(52) U.S. Cl.
CPC .......... *H04L 9/002* (2013.01); *G06F 16/1805* (2019.01); *G06F 21/71* (2013.01); *H04L 9/0643* (2013.01); *H04L 63/123* (2013.01); *H04L 67/10* (2013.01); *H04L 2209/38* (2013.01)

(58) Field of Classification Search
CPC ..... G06F 21/71; G06F 16/1805; H04L 9/002; H04L 9/0643; H04L 63/123; H04L 2209/38
See application file for complete search history.

(56) References Cited

U.S. PATENT DOCUMENTS

| | | | |
|---|---|---|---|
| 3,582,908 A | 6/1971 | Koo | |
| 3,641,516 A | 2/1972 | Castrucci et al. | |
| | (Continued) | | |

FOREIGN PATENT DOCUMENTS

| | | |
|---|---|---|
| JP | 08-297567 A | 11/1996 |
| WO | 2017/207717 A1 | 12/2017 |

OTHER PUBLICATIONS

Yu, L., Tsai, W. T., Li, G., Yao, Y., Hu, C., & Deng, E. (Apr. 2017). Smart-Contract Execution with Concurrent Block Building. In 2017 11th IEEE Symposium on Service-Oriented System Engineering (SOSE) (pp. 160-167). IEEE. (Year: 2017).*

(Continued)

*Primary Examiner* — Robert B Leung
(74) *Attorney, Agent, or Firm* — Sheppard Mullin Richter & Hampton LLP

(57) ABSTRACT

Systems and methods related to processing transaction verification operations in decentralized applications via a fixed pipeline hardware architecture are described herein. The fixed pipeline architecture may be included within a decoupled system architecture comprising a computer system configured to execute smart contracts and a physically separate hardware device configured to perform transaction verification operations. The computer system may be configured to maintain a read-only copy of a ledger shared by a plurality of nodes on a peer-to-peer network, and the hardware device may be configured to perform transaction verification operations. As such, the decoupled system architecture provides added security and privacy for the system and the ledger by preventing malicious smart contracts from accessing and/or updating the modifiable copy of the verified ledger.

20 Claims, 5 Drawing Sheets

(56) References Cited

U.S. PATENT DOCUMENTS

| | | |
|---|---|---|
| 7,599,491 B2 | 10/2009 | Lambert |
| 7,979,569 B2 | 7/2011 | Eisner et al. |
| 8,280,048 B2 | 10/2012 | Lambert |
| 8,621,239 B2 | 12/2013 | Lambert |
| 8,675,869 B2 | 3/2014 | Little et al. |
| 8,972,738 B2 | 3/2015 | Little et al. |
| 2004/0060032 A1 | 3/2004 | McCubbrey |
| 2011/0271007 A1 | 11/2011 | Wang et al. |
| 2015/0332283 A1 | 11/2015 | Witchey |
| 2017/0083998 A1 | 3/2017 | Acharya |
| 2017/0244720 A1 | 8/2017 | Kurian et al. |
| 2017/0331896 A1* | 11/2017 | Holloway ............... H04L 67/12 |
| 2018/0145836 A1* | 5/2018 | Saur ................... G06Q 20/3829 |
| 2018/0181309 A1* | 6/2018 | Miyamae ................ G06F 3/065 |
| 2018/0217942 A1 | 8/2018 | Fons et al. |
| 2018/0219671 A1 | 8/2018 | Velissarios et al. |
| 2018/0247376 A1* | 8/2018 | Sharma .................. G06Q 40/08 |
| 2018/0248880 A1* | 8/2018 | Sardesai ............... H04L 63/101 |
| 2018/0287915 A1 | 10/2018 | Smith et al. |

OTHER PUBLICATIONS

Li X, Jiang P, Chen T, Luo X, Wen Q. A survey on the security of blockchain systems. Future Generation Computer Systems. Aug. 23, 2017. (Year: 2017).*

Zsolt István et al., Consensus in a Box: Inexpensive Coordination in Hardware, USENIX Association, 13$^{th}$ USENIX Symposium on Networked Systems Design and Implementation (NSDI '16), Mar. 16-18, 2016 (15 pages).

Non-Final Office Action dated Jan. 25, 2019, issued in related U.S. Appl. No. 16/122,406 (14 pages).

* cited by examiner

SYSTEMS AND METHODS FOR SECURE SMART CONTRACT EXECUTION VIA READ-ONLY DISTRIBUTED LEDGER

FIELD OF THE INVENTION

The invention relates to systems and methods for processing transaction verification operations in decentralized applications via a fixed pipeline hardware architecture.

BACKGROUND OF THE INVENTION

Decentralized applications are applications that run on peer-to-peer networks, rather than on a single computer. Transactions associated with decentralized applications are typically processed by nodes (or computers) on the peer-to-peer network based on trustless protocols or a series of validation rules established by the creators of the decentralized application. A critical component of decentralized applications is the manner in which transactions associated with the decentralized application are verified and recorded.

In many decentralized applications, verified transactions and/or other information is committed to a blockchain. Many types of blockchains exist. In general, they are distributed ledgers shared by the nodes on a network to which transactions are recorded and validated. A block is a part of a blockchain, in which some or all of the recent transactions may be recorded. Once completed, a block is stored in the blockchain as a permanent database. Each time a block gets completed, a new one is generated. Each block in the blockchain is connected to the others (like links in a chain) in proper linear, chronological order. Every block contains a hash of the previous block. The blockchain has information about different user addresses and their balances right from the genesis block to the most recently completed block.

A critical component of decentralized applications are smart contracts. A smart contract can be thought of as computerized transaction protocol that executes terms of a contract. In other words, smart contracts are essentially self-executing contracts with the terms of an agreement between parties being directly written into and executed by lines of code. The code and the agreements contained therein can exist across a distributed, decentralized blockchain network. Using a scripting language or other techniques, a smart contract can include logic-based programs that run on top of a blockchain.

For most decentralized applications operating on blockchain-based systems, smart contracts are utilized to administer the decentralized application and/or one or more aspects of the decentralized application. For example, when a user generates a transaction, at least one endorsement is required. Another user (such as a banker in the case of a bank transaction) may endorse the user's transaction. This endorsed transaction may comprise a smart contract.

Typically, the most vulnerable stage of a blockchain-based system is the execution of smart contracts. In conventional blockchain-based system, the ledger embodied by the blocks of a blockchain may be accessed and modified directly by the computer (or CPU) at any node on the peer-to-peer network. In order to attack the system, a hacker may write a malicious smart contract, install it onto the system by hacking a CPU, and follow it with overflow or reentry attacks. In doing so, the hacker may take advantage of the host by essentially modifying the blockchain to their advantage. For example, attacking the system in this way may enable a hacker to withdraw a customer's balance, thus jeopardizing the security of the entire system. This vulnerability of the system is further exacerbated by the known and unknown vulnerabilities of any given CPU on the network. It would be desirable to provide systems and methods that address the privacy and security concerns associated with the execution of smart contracts in decentralized applications.

SUMMARY OF THE INVENTION

The systems and methods described herein relate to a fixed pipeline hardware architecture configured to process transaction verification operations for decentralized applications. The fixed pipeline architecture may be included within a decoupled system architecture configured to execute smart contracts and perform transaction verification operations on separate components. The decoupled system architecture may comprise at least a computer system and a physically separable self-contained hardware device. The execution of smart contracts and the performance of transaction verification operations may be performed on the separable components. Each of the separable components may comprise separate and distinct copies of a ledger shared by a plurality of nodes on a peer-to-peer network. The computer system may be configured to maintain a read-only copy of the ledger and perform smart contract execution. The self-contained hardware device may be configured to maintain a shadow copy of the ledger and perform transaction verification operations.

Because only the hardware device is able to modify a copy of the ledger stored and/or maintained by the decoupled system architecture, the endorsement phase in which smart contracts are executed cannot update or write final data in the distributed ledger. The computer system may be physically removed from a modifiable copy of the ledger (i.e., the shadow copy of the ledger). As such, the execution of smart contracts cannot modify the distributed ledger at a single node. Therefore, the decoupled system architecture provides added security and privacy for the system and the ledger by preventing malicious smart contracts from accessing and/or updating the modifiable copy.

The fixed pipeline hardware architecture described herein may include and/or support at least a high-speed direct memory access (DMA) configured to access a ledger (e.g., the shadow copy of the ledger) stored in local memory, a crypto engine, a read set validation engine, and/or one or more other components, engines, or modules configured to accelerate the transaction verification process. In some implementations, the fixed pipeline architecture may include multiple crypto engines and/or multiple read set validation engines based on performance, cost, or power tradeoffs.

The crypto engine may itself comprise a hardware architecture configured to perform cryptographic operations necessary to validate signatures for transactions in decentralized applications. For example, the one or more cryptographic operations may comprise crypto signature generation (encrypt) operations and crypto signature verification (decrypt) operations. In various implementations, the hardware architecture of a crypto engine may include a scheduler and a parallel cryptographic execution array comprising a set of cryptographic execution units configured to operate in parallel.

In various implementations, each of the cryptographic execution units may be configured to perform one of more specific cryptographic operations or types of cryptographic operations independently. Because each of the cryptographic execution units may be associated with one or more cryptographic operations, the cryptographic execution units may be configurable for different decentralized applications. The scheduler may be configured to identify the cryptographic operations required to authenticate one or more cryptographic signatures and dispatch tasks related to the signatures among the series of cryptographic execution units.

The read set validation engine may be configured to verify whether a transaction is valid based on a comparison of an incoming transaction state indicating transaction data for the transaction and a local state related to the transaction. The incoming transaction state may be determined based on the ledger reading set obtained from an incoming block and related to a ledger maintained by the decentralized application. In various implementations, the local state may be compared to the transaction state. Based on the comparison of the local state and the transaction state, read set validation engine may be configured to verify whether the ledger reading set (and the transaction) is valid.

Based on the results of the signature validation by the crypto engine and the ledger reading set validation, the fixed pipeline hardware architecture may determine whether to process the transaction, commit the transaction to the blockchain, and update the verified ledger. Regardless of the results of the ledger reading set validation and the results of the signature validation or the comparison thereof, the transaction is committed (or written) to the blockchain. However, based on the comparison of the results of the ledger reading set validation and the results of the signature validation, the fixed pipeline hardware architecture may also write the transaction to a state cache and update the global state based on the transaction. Specifically, if both the ledger reading set and the cryptographic signatures are valid, the fixed pipeline hardware architecture will cause the transaction to be written to a state cache and update the global state based on the transaction. If either the ledger reading set or the cryptographic signatures are invalid, the fixed pipeline hardware architecture is specifically configured to not update the global state based on the transaction.

These and other objects, features, and characteristics of the system and/or method disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The systems and methods described herein related to a fixed pipeline hardware architecture configured to process transaction verification operations in decentralized applications. The fixed pipeline architecture may be included within a decoupled system architecture comprising a computer system configured to execute smart contracts and a self-contained hardware device configured to perform transaction verification operations. The computer system may be configured to maintain a read-only copy of a ledger shared by a plurality of nodes on a peer-to-peer network, and the hardware device may be configured to perform transaction verification operations. As such, the decoupled system architecture provides added security and privacy for the system and the ledger by preventing malicious smart contracts from accessing and/or updating the modifiable copy of the verified ledger.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
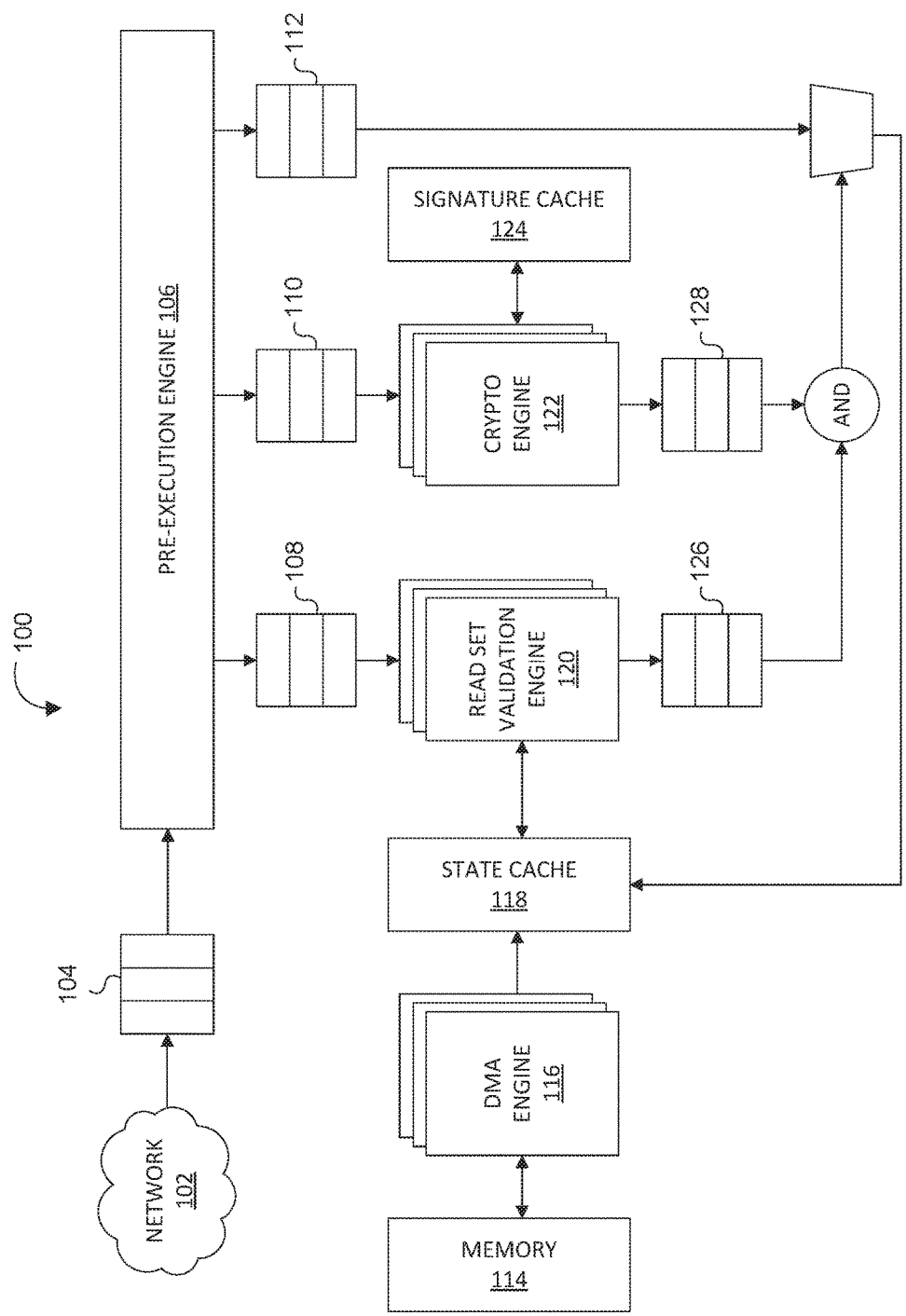
FIG. 1 depicts a block diagram of an example of a system configured to process transaction verification operations in decentralized applications, in accordance with one or more implementations of the invention.

FIG. 1 depicts a block diagram of an example of a system 100 configured to process transaction verification operations in decentralized applications, in accordance with one or more implementations of the invention. In various implementations, system 100 may comprise a hardware device. For example, system 100 may comprise one or more processing devices (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) configured to accelerate the transaction verification process. In some implementations, system 100 may comprise a single self-contained hardware device configured to be communicatively coupled or physically attached to a component of a computer system. In an exemplary implementation, system 100 may comprise electronic circuitry and/or a printed circuit board that can be inserted into an electrical connector or expansion slot of a computer system. For example, system 100 may comprise an expansion card, expansion board, adapter card, or accessory card configured to accelerate the transaction verification process. In some implementations, system 100 may comprise an application specific integrated circuit (ASIC) or a field-programmable gate array (FPGA) configured to perform transaction verification operations associated with one or more decentralized applications.

System 100 may include one or more hardware components. In various implementations, the one or more hardware components of system 100 may include an incoming block buffer 104, a pre-execution engine 106, a read set holding buffer 108, a signature validation buffer 110, a write set holding buffer 112, local memory 114, a DMA engine 116, a state cache 118, a read set validation engine 120, a crypto engine 122, a signature cache 124, a read set validation result buffer 126, a signature validation result buffer 128, and/or other components. In various implementations, the one or more hardware components of system 100 may form a fixed pipeline hardware architecture configured to accelerate the transaction verification process. For example, the one or more hardware components may configure system 100 to verify the authenticity of transactions in a block, check the validity of the transactions, and/or commit (or write) the block and the validation results onto the blockchain.

System 100 may be configured to accelerate the verification of transactions received via network 102. System 100 may be configured to receive a block comprising a set of transactions via network 102. In various implementations, incoming block buffer 104 may be configured to cache the received block. In some implementations, incoming block buffer 104 may be configured to cache the received block prior to pre-execution of the received block.

In various implementations, system 100 may include a pre-execution engine 106. Pre-execution engine 106 may be configured to conduct pre-execution of new transactions while a new block is being created. By pre-executing the transaction validations, pre-execution engine 106 may significantly reduce the latency of a transaction's life cycle and greatly improve the throughput of a computer system to which system 100 is communicatively coupled and/or physically attached.

Blocks received and cached in incoming block buffer 104 may be inserted into one of a set of queues. A block comprising a set of transactions may include a ledger reading set, cryptographic signatures to be authenticated, and a ledger writing set. In various implementations, the ledger reading set of an incoming block may be inserted into read set holding buffer 108, cryptographic signatures of an incoming block to be authenticated may be inserted into signature validation buffer 110, and the ledger writing set of an incoming block may be inserted into write set holding buffer 112. In order for a transaction to be validated, both the ledger reading set and cryptographic signatures must be valid. If valid, the ledger writing set is applied to the global state (as described further herein). If not valid, the ledger writing set will not be applied to the global state. All valid information for a transaction is saved and committed (written) into the blockchain.

In various implementations, system 100 may include one or more of read set validation engine 120 and crypto engine 122. Accordingly, system 100 may include multiple read set validation engines 120 and/or multiple crypto engines 122. In some implementations, system 100 may include multiple read set validation engines 120 and/or multiple crypto engines 122 based on performance tradeoffs, cost tradeoffs, and/or power tradeoffs. As such, system 100 may be configurable based on the number of read set validation engines 120 and/or crypto engines 122 contained therein.

Each read set validation engine 120 may be configured to fetch ledger data and validate the ledger reading set against the global state. The global state may refer to the current status related to one or more data points in a verified ledger written to the blockchain. In various implementations, read set validation engine 120 may be configured to receive the ledger reading set of an incoming block from read set holding buffer 108. Read set validation engine 120 may be configured to interface with state cache 118 to obtain and cache data required to validate ledger reading set against the global state. In various implementations, the results of the ledger reading set validation by read set validation engine 120 may be cached in read set validation result buffer 126 at least until they are compared to results of the signature validation by crypto engine 122. Read set validation engine 120 is further described herein in connection with FIG. 2.

Each crypto engine 122 may comprise one or more cryptographic functional units. Each cryptographic functional unit may comprise a core configured to perform one or more cryptographic operations required to verify the authenticity of transactions in a block. For example, the one or more cryptographic operations may comprise crypto signature generation (encrypt) operations and crypto signature verification (decrypt) operations. In various implementations, crypto engine 122 may be configured to receive cryptographic signatures of a block to be authenticated from signature validation buffer 110. Crypto engine 122 may be configured to interface with signature cache 124 to obtain and cache data required to authenticate cryptographic signatures associated with a transaction. In various implementations, the results of the signature validation by crypto engine 122 may be cached in signature validation result buffer 128 at least until they are compared to results of the read set validation by read set validation engine 120. Crypto engine 122 is further described herein in connection with FIG. 3.

In various implementations, system 100 may comprise a direct memory access (DMA) engine 116. DMA engine 116 may be configured to fetch data required to verify the authenticity and read set data of a transaction. For example, DMA engine 116 may be configured to fetch existing blocks and signatures accessed by a transaction. In various implementations, DMA engine 116 may be configured to access a ledger in memory required to validate data associated with a transaction. For example, DMA engine 116 may be configured to access local memory 114 to obtain a ledger required to validate data associated with a transaction.

In various implementations, read set validation result buffer 126 may comprise a cache of results of the ledger reading set validation by read set validation engine 120 and signature validation result buffer 128 may comprise a cache of the results of the signature validation by crypto engine 122.

In various implementations, system 100 may be configured to compare the results of the ledger reading set validation cached in read set validation result buffer 126 and the results of the signature validation cached in signature validation result buffer 128. Regardless of the results of the ledger reading set validation and the results of the signature validation or the comparison thereof, system 100 is configured to commit (or write) the transaction to the blockchain. However, based on the comparison of the results of the ledger reading set validation and the results of the signature validation, system 100 may also write the transaction to the state cache and update the global state based on the transaction. Specifically, if both the ledger reading set and the cryptographic signatures are valid, system 100 may be configured to write the transaction to the state cache and update the global state based on the transaction. In order to update the global state based on the transaction, the ledger writing set is applied to the global state. For example, if system 100 determines that both the ledger reading set and the cryptographic signatures are valid for a given transaction, a ledger writing set associated with that transaction cached in write set holding buffer 112 may be applied to the global state to update the global state based on the transaction. If either the ledger reading set or the cryptographic signatures are invalid, system 100 is specifically configured to not update the global state based on the transaction. If the ledger reading set is not valid, it may be due to the fact that there are insufficient funds to process the transaction or that the ledger reading set otherwise indicates that one or more conditions associated with the transaction have not been satisfied. Accordingly, system 100 will not process the transaction by updating the global state. Similarly, if the cryptographic signatures are invalid, it may indicate a potential hack has occurred. Accordingly, system 100 will not process the potentially fraudulent transaction by updating the global state.

Read Set Validation

Figure 2:
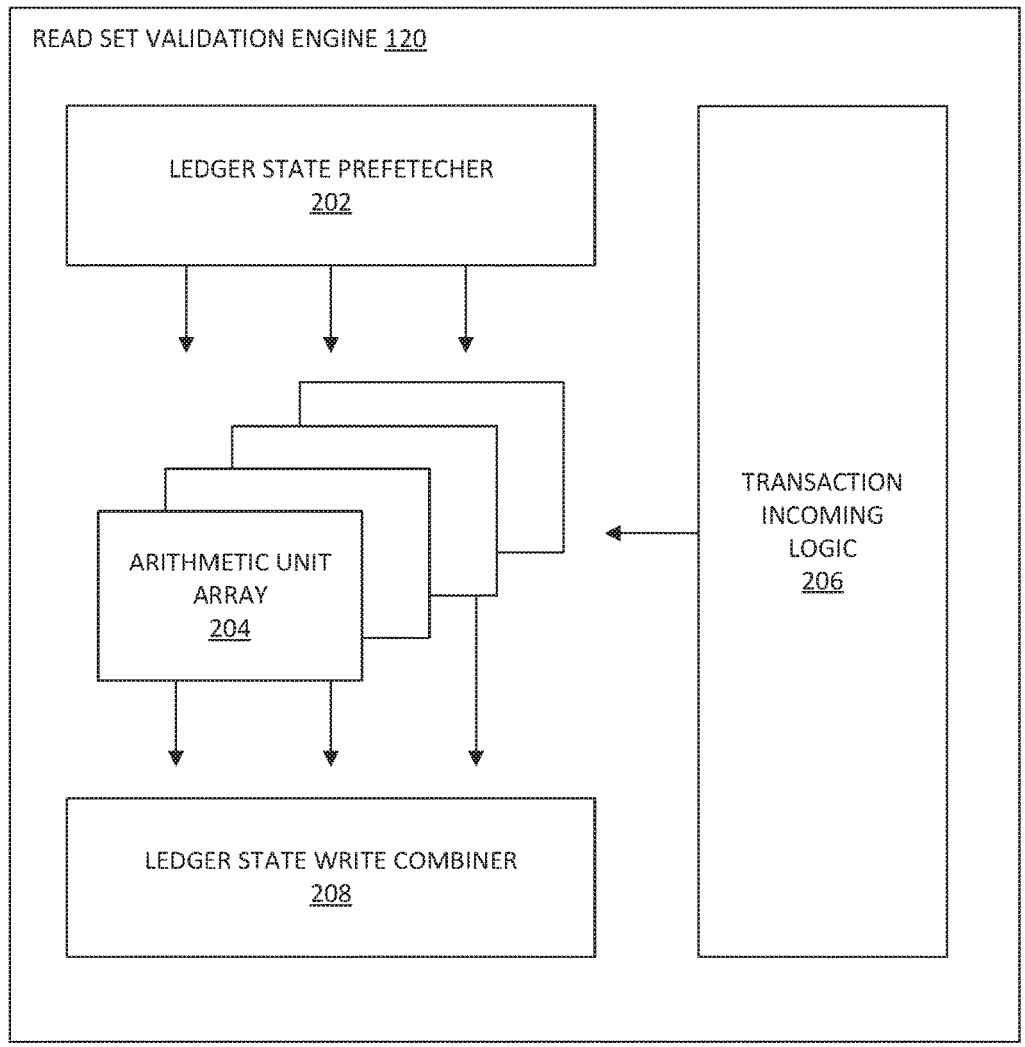
FIG. 2 illustrates a block diagram of an example of a read set validation engine configured to fetch ledger data and validate the ledger reading set against the global state, in accordance with one or more implementations of the invention.

FIG. 2 illustrates a block diagram of an example of read set validation engine 120 configured to fetch ledger data and validate the ledger reading set against the global state, in accordance with one or more implementations of the invention. Read set validation engine 120 may comprise an architecture configured to validate read set data by determining whether a global state satisfies the current requirements of a transaction. In various implementations, one or more hardware components of read set validation engine 120 may form a fixed pipeline hardware architecture configured to fetch ledger data and validate the ledger reading set against the global state for a given transaction. In various implementations, the one or more hardware components of read set validation engine 120 may include a ledger state prefetcher 202, an arithmetic unit array 204, transaction incoming logic 206, a ledger state write combiner 208, and/or one or more other components. Read set validation engine 120 may be configured to obtain data necessary to validate the ledger reading set against the global state from local memory (such as memory 114 and/or state cache 118). In various implementations, read set validation engine 120 may include an input interface from DMA. For example, read set validation engine 120 may include an input interface from DMA engine 116.

In various implementations, read set validation engine 120 may comprise a ledger state prefetcher 202 configured to fetch data required by read set validation engine 120. In some implementations, ledger state prefetcher 202 may be configured to fetch a ledger state from state cache 118. In some implementations, ledger state prefetcher 202 may be configured to fetch a ledger state from state cache 118 via a high-speed memory interface. In some implementations, ledger state prefetcher 202 may be configured to prefetch a ledger state from state cache 118. Fetching from local memory would require accessing the entire memory, which would slow down throughput speed in the read set validation engine. Prefetching the ledger state from state cache 118 (which is local memory) would provide read set validation engine 120 with data from local memory without having to access the entire local memory for each computation. In various implementations, read set validation engine 120 may include transaction incoming logic 206 configured to extract state information from an incoming transaction. Accordingly, ledger state prefetcher 202 may be configured to obtain a local state from memory and transaction incoming logic 206 may be configured to obtain an incoming transaction state from the transaction data.

In various implementations, read set validation engine 120 may include arithmetic unit array 204 configured to perform a read set comparison against pre-executed results. In various implementations, arithmetic unit array 204 may be configured to perform computing tasks to verify transactions. In some implementations, arithmetic unit array 204 may be configured to operate in parallel. In other words, arithmetic unit array 204 may be configured to perform parallel processing of validation compute tasks for a single transaction and/or different transactions simultaneously. In various implementations, arithmetic unit array 204 may be configured to verify that a local copy of a state (obtained from memory) and the incoming transaction state match.

In various implementations, read set validation engine 120 may include ledger state write combiner 208 configured to perform a burst write for transaction results to the resulting buffer (i.e., read set validation result buffer 126). If an incoming transaction is validated (if the local copy of a state and the incoming transaction state match), ledger state write combiner 208 may be configured to combine states together and write to read set validation result buffer 126.

In an exemplary implementation in which a decentralized application involves a banking institution, each of the bank customers with an account may have their account written to a blockchain. Accordingly, the current status of each account and a history of every transaction involving each account is written to the blockchain, and the current status of each account would comprise the global state. In this exemplary implementation, system 100 may be configured to verify a block comprising a set of transactions involving bank customers. Transaction incoming logic 206 may be configured to obtain an incoming transaction state from the transaction data. For example, transaction incoming logic 206 may be configured to determine that a transaction involving a first bank customer involves a stock purchase for $3,000 and a transaction involving a second bank customer involves a transfer of $4,000. Read set validation engine 120 may be configured to obtain from memory (e.g., memory 114) a local state. The local state may comprise the global state indicating that a current account of the first customer comprises $2,000 and that a current account of the second customer comprises $8,000. Read set validation engine 120 may be configured to determine whether the current state meets the requirements for a given transaction. For example, arithmetic unit array 204 may be configured to compare the local state of the first customer (i.e., $2,000) and the incoming transaction state for the transaction involving the first customer (i.e., a transaction requiring $3,000), and compare the local state of the second customer (i.e., $8,000) and the incoming transaction state for the transaction involving the second customer ($4,000). Accordingly, read set validation engine 120 may be configured to determine that the transaction involving the first bank customer is invalid and that the transaction involving the second bank customer is valid.

In various implementations, the results of the ledger reading set validation by read set validation engine 120 may be cached in read set validation result buffer 126. For example, an indication that the transaction involving the first customer is invalid and an indication that the transaction involving the second customer is valid may be cached in read set validation result buffer 126. In various implementations, the results of the ledger reading set validation (i.e., the indication that the transaction involving the first customer is invalid and the indication that the transaction involving the second customer is valid) may be cached in read set validation result buffer 126 at least until they are compared to the results of the signature validation by crypto engine 122.

Cryptographic Signature Validation

Figure 3:
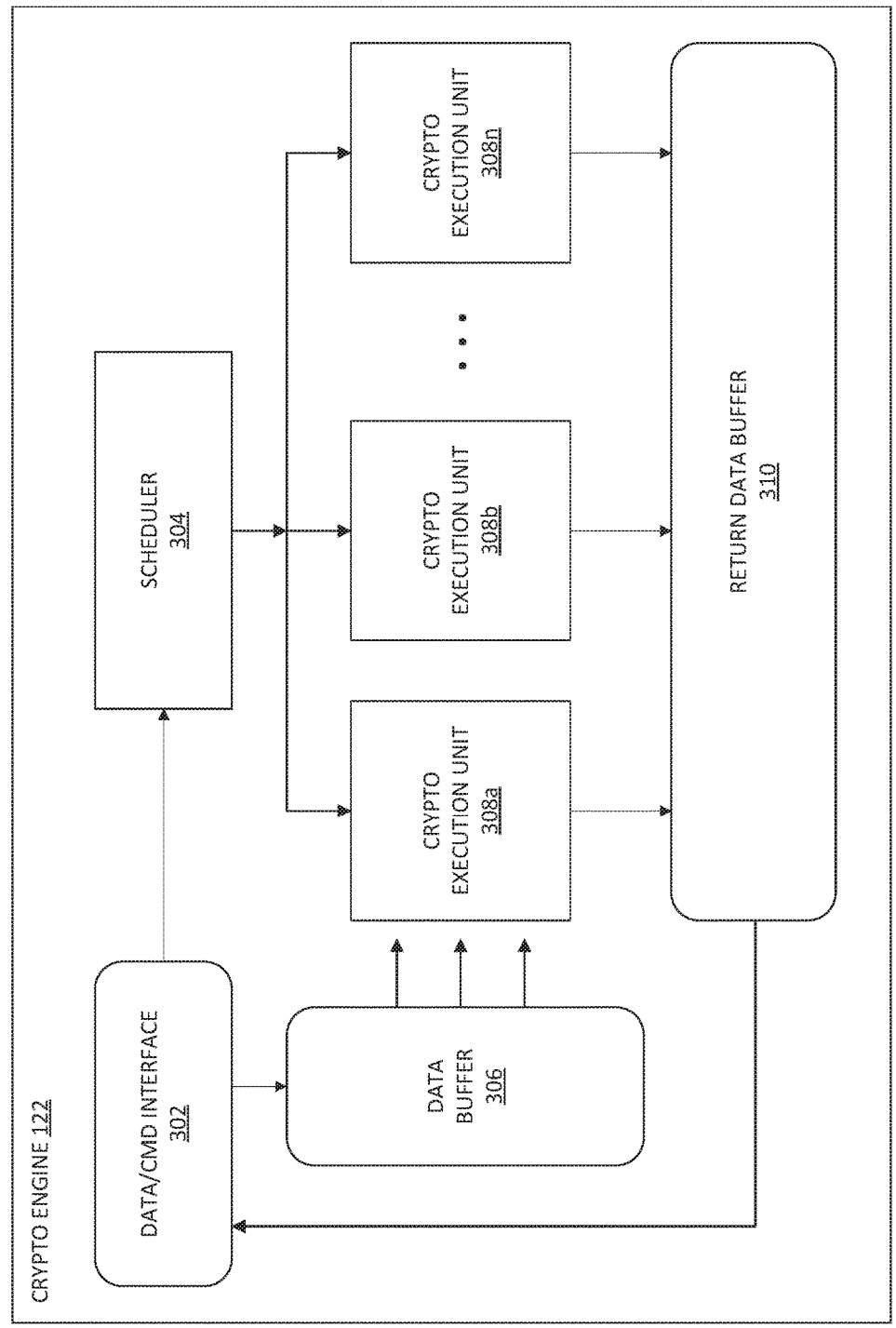
FIG. 3 illustrates a block diagram of an example of a crypto engine configured to perform one or more cryptographic operations required to verify the authenticity of transactions in a block, in accordance with one or more implementations of the invention.

FIG. 3 illustrates a block diagram of an example of crypto engine 122 configured to perform one or more cryptographic operations required to verify the authenticity of transactions in a block, in accordance with one or more implementations of the invention. Crypto engine 122 may comprise an architecture configured to perform necessary cryptographic operations. In various implementations, one or more hardware components of crypto engine 122 may form a fixed pipeline hardware architecture configured to perform necessary cryptographic operations. In various implementations, the one or more hardware components of crypto engine 122 may include a data/CMD interface 302, a scheduler 304, a data buffer 306, one or more crypto execution units 308 (308a, 308b, . . . , 308n), a return data buffer 310, and/or one or more other components. In some implementations, crypto engine 122 may include multiple crypto execution units. For example, crypto engine 122 may include n-number of crypto execution units 308 wherein "n" is any number greater than 1. Crypto execution units 308 are also referred to herein as cryptographic execution units.

Cryptographic operations are implemented in system 100 via a highly-parallel architecture. In various implementations, crypto engine 122 may include multiple crypto execution units 308 configured to operate in parallel. In various implementations, crypto engine 122 may include multiple crypto execution units 308 configured to form a parallel cryptographic execution array. In various implementations, each individual crypto execution unit 308 is coupled to one or more other crypto execution units and is configured to share hardware resources with one or more other crypto execution units. For example, an individual crypto execution unit 308 may be configured to share a random number generator (e.g., shared random number generator 408) with one or more other crypto execution units. Other resources may be dedicated to individual crypto execution units. For example, one or more hardware resources (e.g., hashing and table lookup) may be dedicated to individual crypto execution units (e.g., crypto execution unit 308).

In various implementations, data required by one or more crypto execution units 308 may be obtained via data buffer 306. Data buffer 306 may be configured to cache data required to perform cryptographic operations related to authenticate cryptographic signatures for a block comprising a set of transactions. For example, data buffer 306 may be configured to cache algorithm parameters required to verify a cryptographic signature, hash values (e.g., hash public key and hash private key), and other data written to a block comprising a set of transactions crypto engine 122 is tasked to verify. In various implementations, data buffer 306 may be software-managed. In some implementations, data buffer 306 may be partitioned into different physical regions and each physical region may be associated with one or more different transactions. For example, each transaction may be assigned or be associated with a specific transaction ID. Each partitioned physical region of data buffer 306 may be associated with one or more specific transaction IDs. The partitioned nature of data buffer 306 enables information needed by the individual crypto execution units 308 to be easily accessed based on the transaction ID.

In various implementations, data buffer 306 may be configured to provide parameters to scheduler 304 to enable scheduler 304 to determine the type of algorithm required to authenticate a cryptographic signature, but withhold hash values that are much larger in size and are not required by scheduler 304 to make the foregoing determination. For example, hash values may comprise 512 bits, public keys and/or private keys may comprise 256 bits, and cryptographic algorithm parameters may comprise 256 bits. Scheduler 304 may be configured to determine cryptographic operations required to authenticate a cryptographic signature using only the cryptographic algorithm parameters. Data buffer 306 may obtain data via data/CMD interface 302. Data/CMD interface 302 may comprise a high-speed and/or high-bandwidth interface. For example, data/CMD interface 302 may comprise a PCIe electrical interface or an Ethernet networking interface. In some implementations, data buffer 306 may be configured to prefetch transaction data, signatures, private keys, and/or other information associated with transactions to be verified. Once a cryptographic operation has been dispatched to a specific crypto execution unit 308, that crypto execution unit 308 may be configured to access the required information to perform the cryptographic operation from data buffer 306.

In various implementations, scheduler 304 may be configured to identify the cryptographic operations required to authenticate one or more cryptographic signatures and dispatch tasks related to the cryptographic signatures to at least one of the one or more crypto execution units 308. For example, scheduler 304 may be configured to identify the cryptographic operations required to authenticate one or more cryptographic signatures and coordinate tasks related to the cryptographic signatures to be performed by an array of crypto execution units as described in co-pending U.S. patent application Ser. No. 16/122,406, entitled "SYSTEMS AND METHODS FOR ACCELERATING TRANSACTION VERIFICATION BY PERFORMING CRYPTOGRAPHIC COMPUTING TASKS IN PARALLEL,", the disclosure of which is hereby incorporated by reference in its entirety herein.

Each cryptographic operation may require a specific algorithm. For example, the cryptographic operation may require the elliptic curve digital signature algorithm (ECDSA), the ECDH algorithm, the RSA algorithm, the ASE algorithm, the zk-SNARKs algorithms, and/or one or more other specific algorithms. Each algorithm may have different priorities and/or parameters. In various implementations, scheduler 304 may be configured to identify the algorithmic parameters associated with one or more cryptographic signatures. In various implementations, scheduler 304 may be configured to determine the type of algorithm required to authenticate a cryptographic signature and the relevant parameters, and dispatch the cryptographic signature to one of the one or more crypto execution units 308 based on the determination. In various implementations, scheduler 304 may be configured to determine the cryptographic operations required to authenticate one or more cryptographic signatures without accessing the hash values for the individual cryptographic signatures. In other words, scheduler 304 may be configured to determine the cryptographic operations required to authenticate one or more cryptographic signatures with only the algorithm and parameters associated with a given cryptographic signature to be verified.

In various implementations, scheduler 304 may be configured to cooperate with one or more software layers to support non-blocking transition cryptographic operations. For example, scheduler 304 may cooperate with one or more software layers to meet the demands of decentralized applications in which one or more transitions in a particular channel have a higher priority over other blocks. In some implementations, the one or more software layers may include a credit-control mechanism. The credit-control mechanism may comprise software configured to obtain an indication of the hardware limits and capabilities of system 100 and crypto execution units 308 in crypto engine 122 and verify that the number of transactions being processed does not exceed the hardware limits and capabilities of system 100 or crypto execution units 308. In some implementations, the credit-control mechanism may be configured to limit the number of transactions processed by system 100 at a given time to ensure the number of transactions being processed by system 100 does not exceed the hardware limits and capabilities of system 100. In some implementations, scheduler 304 may interface with the credit-control mechanism to limit the number of cryptographic operations being routed to individual crypto execution units 308 at a given time to ensure the number of cryptographic tasks being routed to individual crypto execution units 308 does not exceed the hardware limits and capabilities of system 100.

In some implementations, cryptographic operations may be dispatched by scheduler 304 to only a subset of the one or more crypto execution units 308. As such, one or more of a set of crypto execution units 308 may be idle at a given time while other crypto execution units 308 are performing cryptographic operations. In various implementations, crypto engine 122 may comprise a dispatcher configured to control the main dataflow for each crypto execution unit 308.

In various implementations, each of the one or more crypto execution units 308 may be associated with one or more cryptographic operations or one or more types of cryptographic operations. In other words, the one or more crypto execution units 308 may be configurable for different decentralized applications. For example, crypto execution unit 308a may be configured to perform a first cryptographic operation and crypto execution unit 308b may be configured to perform a second cryptographic operation. Accordingly, when operating in parallel, different cryptographic operations may performed simultaneously by different crypto execution units 308 configured to perform specific cryptographic operations.

In various implementations, each crypto execution unit 308 may be configured to support one or more of a set of macro operations required to authenticate one or more cryptographic signatures and verify a transaction in a decentralized application. For example, each crypto execution unit 308 may be configured to perform one or more of elliptic curve point multiplication; a SHA-1 hash function; modular addition, multiplication, and/or inversion; random number generation; and/or one or more other operations required to authenticate one or more cryptographic signatures and verify a transaction in a decentralized application.

Each crypto execution unit 308 may be configured to operate in parallel and perform one or more cryptographic operations required to verify the authenticity of transactions in a block. Because each of the crypto execution units may be associated with one or more cryptographic operations, the crypto execution units may be configurable for different decentralized applications. Accordingly, the implementation of each crypto execution unit 308 varies according to different elliptic curve parameters. Scheduler 304 is configured to issue specific cryptographic operations into the fitting crypto execution unit 308 based on the curve parameters associated with the required cryptographic operation, as described herein.

In some implementations, at least one crypto execution unit 308 may be configured to perform cryptographic operations related to the elliptic curve digital signature algorithm (ECDSA). For example, crypto engine 122 may be comprise at least one crypto execution unit 308 configured to perform cryptographic operations related to the elliptic curve digital signature algorithm (ECDSA) as described in co-pending U.S. patent application Ser. No. 16/122,406, entitled "SYSTEMS AND METHODS FOR ACCELERATING TRANSACTION VERIFICATION BY PERFORMING CRYPTOGRAPHIC COMPUTING TASKS IN PARALLEL,", the disclosure of which is hereby incorporated by reference in its entirety herein.

Each crypto execution unit 308 of crypto engine 122 may be of the same type or a different type of one or more of the other crypto execution units 308 of crypto engine 122. For example, the types of crypto execution units 308 included within crypto engine 122 may include ECDSA SECP256K1 encrypt, ECDSA SECP256R1 encrypt, RSA encrypt, ASE encrypt, ECDH encrypt, Zk-SNARKs encrypt, ECDSA SECP256K1 decrypt, ECDSA SECP256R1 decrypt, RSA decrypt, ASE decrypt, ECDH decrypt, Zk-SNARKs decrypt, and/or one or more other types of crypto execution units.

In various implementations, each result of cryptographic operations performed by one of the one or more crypto execution units 308 may be temporarily stored in return data buffer 310. The time required to perform different cryptographic operations may vary. Accordingly, crypto execution units 308 may require different amounts of time to perform their assigned cryptographic operation. As such, in some implementations, the results from the cryptographic operations performed for a given block or set of transactions may be provided by crypto execution units 308 at different times. Accordingly, return data buffer 310 may be configured to temporarily store the results of cryptographic operations performed by crypto execution units 308 and reorder the results before the results are cached in signature validation result buffer 128.

In various implementations, return data buffer 310 may be software-managed. In some implementations, return data buffer 310 may be partitioned into different physical regions and each physical region may be associated with one or more different transactions. For example, each transaction may be assigned or be associated with a specific transaction ID. Each partitioned physical region of return data buffer 310 may be associated with one or more specific transaction IDs. Based on the transaction ID assigned to a given transaction, return data buffer 310 may be configured to push back the return value of the results of the signature validation by crypto engine 122 to data/CMD interface 302 in a software-defined order. In some implementations, data/CMD interface 302 may be configured to cause the results of the signature validation by crypto engine 122 that are pushed back to be cached in signature validation result buffer 128. The partitioned nature of return data buffer 310 enables the results of the individual cryptographic operations performed by the one or more crypto execution units 308 to be easily accessed and ordered based on the transaction ID to facilitate transaction verification for the transaction associated with the transaction ID by system 100.

Read-Only Implementation

Figure 4:
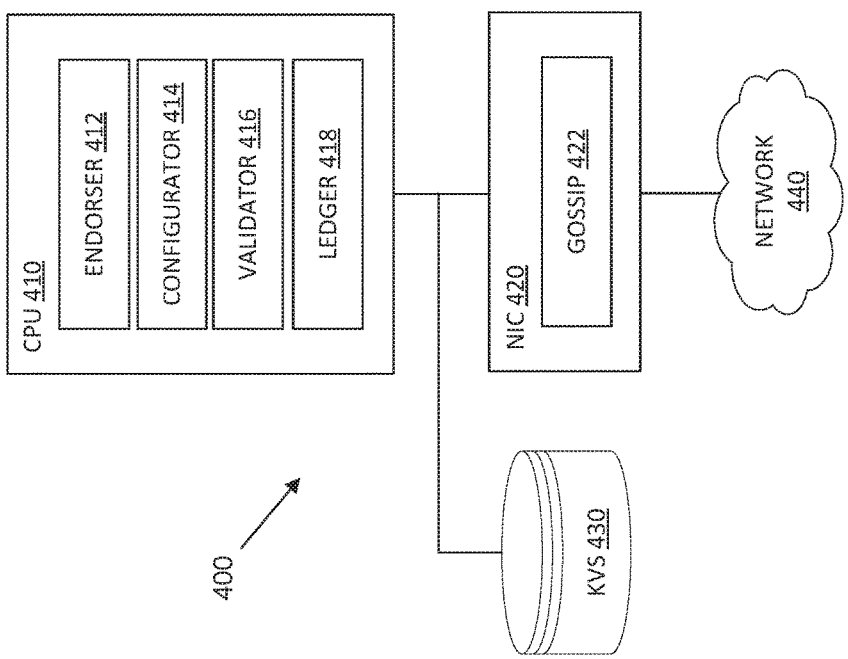
FIG. 4 illustrates a block diagram of a system comprising a standard computing architecture configured to perform distributed ledger operations, in accordance with one or more implementations of the invention.

FIG. 4 illustrates a block diagram of a system 400 comprising a standard computing architecture configured to perform distributed ledger operations, in accordance with one or more implementations of the invention. In various implementations, the computing architecture of system 400 may represent a standard computing architecture for a single node in a peer-to-peer network that is configured to process transactions associated with a decentralized application. For example, the node may comprise a fabric peer executing on CPU 410.

System 400 may include one or more hardware components. In various implementations, the hardware components of system 400 may include at least a CPU 410 and a network interface card 420. CPU 410 may comprise a computer processing unit or one or more other types of non-secure computing devices. In some implementations, CPU 410 may be physically and/or communicatively coupled to electronic storage configured to store a copy of a ledger shared by a plurality of nodes on a network (e.g., network 440). The copy of the ledger may comprise a read and write copy of the ledger. Network interface card 420 may comprise a circuit board or card that is installed in computer of CPU 410 so that it can be connected to a network (e.g., network 440). Each of CPU 410 and network interface card 420 may be configured to perform one or more distributed ledger operations. CPU 410 and network interface card 420 may comprise physically separate computing devices configured to cooperate to process transactions associated with a decentralized application.

In various implementations, each of CPU 410 and network interface card 420 may include one or more components, engines, or modules configured to perform, or assist in the performance of, one or more distributed ledger operations. CPU 410 may include an endorser module 412, a configurator module 414, a validator module 416, a ledger module 418, and/or one or more other components, engines, or modules. Network interface card 420 may include a gossip module 422, and/or one or more other components, engines, or modules.

In various implementations, the hardware components of system 400 may also include a key-value store 430 and/or one or more other hardware components. Key-value store 430 may comprise an electronic database configured to store information or data necessary to perform one or more distributed ledger operations. For example, in various implementations, key-value store 430 may be configured to store a hash table which may be used to map public and private keys to their corresponding value. In various implementations, the one or more hardware components of system 400 may be configured to interface with key-value store 430 to store, retrieve, and manage the information or data stored therein.

The various components illustrated in FIG. 4 may be coupled to at least one other component via a network 440, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In various implementations, network 440 may comprise a network the same as or similar to network 102 described herein in connection with FIG. 1.

In various implementations, endorser module 412 may be configured to execute smart contracts for a decentralized application. In decentralized applications operating on blockchain-based systems, smart contracts may be utilized to administer the decentralized application and/or one or more aspects of the decentralized application. For example, when a user generates a transaction, at least one endorsement is required. Another user (such as a banker in the case of a bank transaction) may endorse the user's transaction. This endorsed transaction may comprise a smart contract. In various implementations, endorser module 412 may be configured to execute the smart contract. In various implementations, endorser module 412 may be configured to generate a read set and/or a write set. A read set (also referred to herein as a "ledger reading set" or "read set data") may contain a list of unique keys involved in a given transaction and the committed versions for those unique keys. A write set (also referred to herein as a "ledger writing set") may contain a list of unique keys involved in a given transaction (which may overlap with the keys in the read set) and the new versions for those unique keys pending execution of the transaction.

In an exemplary implementation, when executing a smart contract related to a given transaction, endorser module 412 may be configured to generate a read set and a write set related to that transaction. In doing so, endorser module 412 may be configured to generate a read set comprising at least the unique keys involved in that transaction (e.g., the public keys for one or more accounts involved in the transaction) and the committed versions for those keys. For example, the committed versions for those keys may comprise the committed values for a given account. The committed values may comprise the values for that account that are recorded on the blockchain (or distributed ledger) shared by the nodes on the network. In the foregoing exemplary implementation, endorser module 412 may also be configured to generate a write set comprising unique keys involved in that transaction (which may overlap with the keys in the read set) and new values for those keys that may represent the values for those keys once the transaction is executed. The keys in the write set may overlap with the keys in the read set because the same accounts needed to verify a transaction may be the keys that are modified based on the transaction. However, in some implementations, each key may not overlap because a key needed to verify a transaction may not be modified by the transaction itself.

Each node on a network does not need to execute a smart contract related to a transaction. However, each node on a network will need to validate the transaction in order to update the copy of the distributed ledger maintained at that node. In various implementations, endorser module 412 may be configured to execute smart contracts for a decentralized application based on an endorsement policy. An endorsement policy may indicate which nodes on a network are required to execute a smart contract related to a transaction. For example, an endorsement policy may require that each transaction be endorsed by a minimum number of endorsing peers (or nodes), a minimum percentage of endorsing peers, or by all endorsing peers that are assigned to a specific smart contract related to a transaction. In some implementations, endorser module 412 may be configured to store one or more endorsement policies each associated with one or more decentralized applications.

In various implementations, configurator module 414 may be configured to manage the performance of distributed ledger operations by system 400. System 400 may be configured to receive requests related to a ledger shared by a peer-to-peer network. In some implementations, configurator module 414 may be configured to receive requests related to a ledger shared by a peer-to-peer network. For example, requests may comprise ledger read operations related to a verified ledger and/or ledger write and update operations related to a verified ledger. A ledger read operation may include obtaining and/or verifying a value associated with a public key in a ledger shared by nodes on a network. A ledger write and update operation may include updating the ledger by committing a transaction to the blockchain. In various implementations, configurator module 414 may be configured to receive requests comprising ledger read operation(s) and/or ledger write and update operation(s) and cause the operations to be performed by the one or more components, engines, or modules of system 400 on the copy of the ledger maintained by ledger module 418 on CPU 410.

In various implementations, validator module 416 may be configured to process transaction verification operations in decentralized applications. For example, validator module 416 may be configured to verify the authenticity of transactions in a block, check the validity of the transactions, and/or commit (or write) the block and the validation results onto the blockchain. In various implementations, validator module 416 may be configured to validate a read set by determining whether a global state satisfies the current requirements of a transaction. In some implementations, validator module 416 may comprise a fixed pipeline hardware architecture configured to fetch ledger data (e.g., from a copy of the ledger maintained by ledger module 418) and validate the read set against the global state for a given transaction. If valid, the write set is applied to the global state. If invalid, the write set will not be applied to the global state. In various implementations, validator module 416 may be configured to commit a validated at transaction to a blockchain by applying a write set for the validated transaction to the global state. In various implementation, validator module 416 may comprise a module or component comprising all or a portion of system 100 described herein in connection with FIG. 1.

In various implementations, ledger module 418 may be configured to maintain a copy of a ledger shared by a plurality of nodes on a network (e.g., network 440). In some implementations, ledger module 418 may be configured to maintain a copy of a ledger shared by a plurality of nodes on a network that may be manipulated via CPU 410. For example, CPU 410, or smart contracts executed by CPU 410, may modify the copy of the ledger shared by the plurality of nodes on a network and maintained in electronic storage physically and/or communicatively coupled to CPU 410. As such, at least one copy of the ledger accessible by CPU 410 may be read and written to by CPU 410.

In various implementations, gossip module 422 may be configured to control communication between CPU 410 and the peer-to-peer network on which a ledger is distributed (e.g., network 440). In some implementations, gossip module 422 may be configured to implement one or more communication protocols. A communication protocol may comprise a set of rules that allows entities on the network to transmit information. In various implementations, gossip module 422 may be configured to implement a gossip protocol. A gossip protocol may comprise a set of one or more rules that govern whether a node (e.g., CPU 410) may broadcast, or relay, transactions to the network. If a transaction is deemed valid, that transaction may be broadcast, or relayed, to the network. However, if an invalid transaction is received from a node on a network, one or more participants (or peers) that received that invalid transaction will not listen to that node for at least a predetermined time period. For example, if CPU 410 received an invalid transaction from another node on the network, gossip module 422 may be configured to prevent communication (or transactions) from that node for 24 hours. In other words, if a transaction is deemed valid by validator module 416, gossip module 422 may be configured to continue to allow communication to be received from the node from which the valid transaction was received. If the transaction is deemed invalid by validator module 416, gossip module 422 may be configured to prevent communication from being received from the node from which the invalid transaction was received for at least a predetermined time period.

As described above, the endorsement stage and the verification stage are both performed in the same physical region (i.e., by CPU 410) in the standard computing architecture of system 400. However, performing both the endorsement stage and the verification stage in the same physical region makes the ledger, and the decentralized application, vulnerable to attack from a malicious party. This vulnerability of the system is further exacerbated by the known and unknown vulnerabilities of any given CPU (e.g., CPU 410) on the network. In order to attack system 400, a hacker may write a malicious smart contract, install it onto the system by hacking a CPU (e.g., CPU 410), and follow it with overflow or reentry attacks. In doing so, the hacker may take advantage of CPU 410 by essentially modifying the blockchain to their advantage. For example, attacking the system in this way may enable a hacker to withdraw a customer's balance, thus jeopardizing the security of the entire system.

Figure 5:
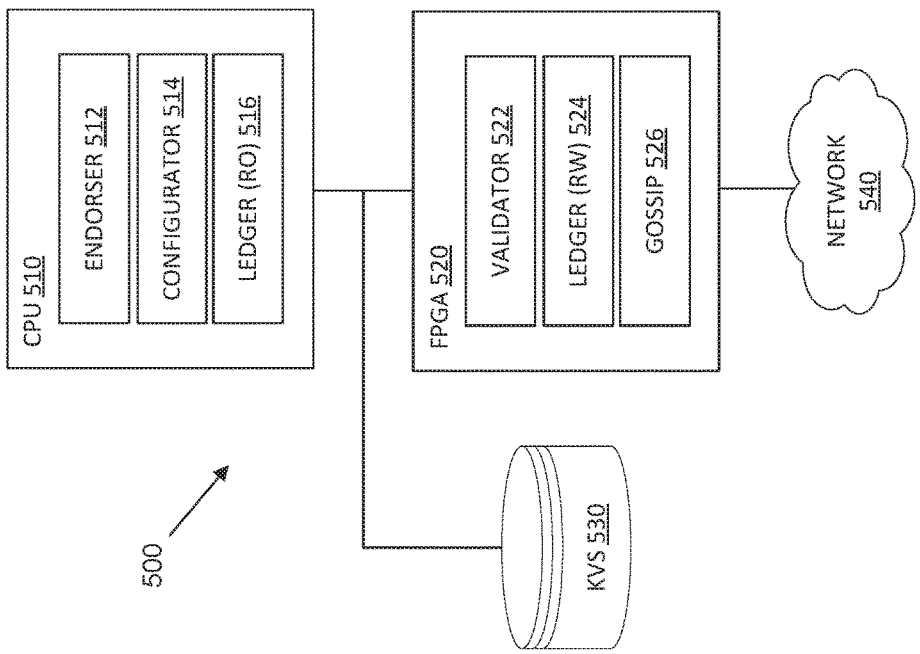
FIG. 5 illustrates a block diagram of a system comprising a decoupled computing architecture configured to perform distributed ledger operations, in accordance with one or more implementations of the invention.

FIG. 5 illustrates a block diagram of a system 500 comprising a decoupled computing architecture configured to perform distributed ledger operations, in accordance with one or more implementations of the invention. System 500 may be configured to securely process transaction verification operations for a decentralized application. In various implementations, the computing architecture of system 500 may represent a decoupled computing architecture for a single node in a peer-to-peer network that is configured to process transactions associated with a decentralized application. For example, the node may comprise a fabric peer executing on CPU 510 and accelerated by FPGA 520 configured to accelerate the transaction verification process.

System 500 may include one or more hardware components. In various implementations, the hardware components of system 500 may include at least a CPU 510 and a field-programmable gate array (FPGA) 520. CPU 510 may comprise a computer processing unit or one or more other types of non-secure computing devices. In some implementations, CPU 510 may comprise any type of computer processing unit or one or more other types of non-secure computing devices where execution of smart contract is software-managed and executed at the endorsement stage in a blockchain system. For example, CPU 510 may comprise a computing processing unit or one or more other types of non-secure computing devices the same as or similar to CPU 410. In some implementations, CPU 510 may be physically and/or communicatively coupled to electronic storage configured to store a copy of a ledger shared by a plurality of nodes on a network (e.g., network 540). As described further herein, the copy of the ledger stored on electronic storage be physically and/or communicatively coupled to (and accessible by) CPU 510 may comprise a read-only copy of the ledger shared by the plurality of nodes on the network. Although described herein as a field-programmable gate array, FPGA 520 may comprise an application specific integrated circuit (ASIC) or a field-programmable gate array (FPGA) configured to perform transaction verification operations associated with one or more decentralized applications. For example, FPGA 520 may include one or more hardware components, such as a module or component comprising all or a portion of system 100 described herein in connection with FIG. 1, configured to accelerate the transaction verification process.

In various implementations, FPGA 520 and CPU 510 may comprise separate physical components. In some implementations, FPGA 520 may comprise a hardware component physically separable from CPU 510. For example, FPGA 520 may comprise an isolated component capable of operating independently of CPU 510. In other words, FPGA 520 may comprise a physically separate self-contained hardware device. Each of CPU 510 and FPGA 520 may be configured to perform one or more separate and distinct operations and maintain separate and distinct copies of a ledger shared by a plurality of nodes on a peer-to-peer network. For example, CPU 510 and FPGA 520 may each be programmed to perform separate distributed ledger operations. Thus, CPU 510 and FPGA 520 may form a decoupled system or computing architecture comprising physically separate computing devices configured to cooperate to process transactions associated with a decentralized application.

In various implementations, each of CPU 510 and FPGA 520 may include one or more components, engines, or modules configured to perform, or assist in the performance of, one or more distributed ledger operations. CPU 510 may include an endorser module 512, a configurator module 514, a ledger (RO) module 516, and/or one or more other components, engines, or modules. FPGA 520 may include a validator module 522, a ledger (RW) module 524, a gossip module 526, and/or one or more other components, engines, or modules.

In various implementations, the hardware components of system 500 may also include a key-value store 530 and/or one or more other hardware components. In various implementations, key-value store 530 may comprise an electronic database the same as or similar to key-value store 430 described herein in connection with FIG. 4.

The various components illustrated in FIG. 5 may be coupled to at least one other component via a network 540. For example, network 540 may comprise a network the same as or similar to network 440 described herein in connection with FIG. 4. In various implementations, network 540 may comprise a network the same as or similar to network 102 described herein in connection with FIG. 1.

In various implementations, endorser module 512 may be configured to execute smart contracts for a decentralized application. In some implementations, endorser module 512 may be configured to execute a smart contract related to a transaction based on a read-only copy of a ledger. For example, endorser module 512 may be configured to execute a smart contract related to a transaction based on a read-only copy of the ledger maintained on or by CPU 510. In various implementations, endorser module 512 may be configured to generate a read set and/or a write set. For example, endorser module 512 may be configured to generate a ledger reading set and a ledger writing set based on the execution of the smart contract. In an exemplary implementation, when executing a smart contract related to a given transaction, endorser module 512 may be configured to generate a read set and a write set related to that transaction. In various implementations, endorser module 512 may comprise a module the same as or similar to endorser module 412 described herein in connection with FIG. 4.

In various implementations, configurator module 514 may be configured to manage the performance of distributed ledger operations by system 500. System 500 may be configured to receive requests related to a ledger shared by a peer-to-peer network. In some implementations, configurator module 514 may be configured to receive requests related to the ledger shared by a peer-to-peer network. For example, requests may comprise one or more ledger read operations related to a verified ledger and/or one or more ledger write and update operations related to a verified ledger. Requests may include a ledger reading set and/or a ledger writing set needed to perform a ledger read operation or a ledger write and update operation. In various implementations, configurator module 514 may be configured to receive requests comprising ledger read operation(s) and/or ledger write and update operation(s) and cause the operations to be performed by the one or more components, engines, or modules of system 500 on one or more copies of the ledger maintained by ledger (RO) module 516 on CPU 510 and/or ledger (RW) module 524 on FPGA 520.

In various implementations, configurator module 514 may be configured to administer performance of ledger read operation(s) and/or ledger write and update operation(s) of a request. For example, configurator module 514 may be configured to determine whether a request comprises a ledger read operation related to the ledger and/or a ledger write and update operation related to the ledger. Responsive to a determination that a request comprises a ledger write and update operation, configurator module 514 may be configured to latch the request pending validation of one or more transactions associated with the request. Latching the request may prevent CPU 510 from executing the request. For example, the request may comprise a ledger write and update operation. By latching the request, CPU 510 may be prevented from modifying a copy of the ledger accessible by CPU 510 based on a request to perform a ledger write and update operation. The request (i.e., the latched request) may be passed down to FPGA 520, which is configured to perform ledger write and update operations.

In various implementations, configurator module 514 may be configured to pass down a request comprising a ledger read operation. For example, responsive to a determination that a request comprises a ledger read operation, configurator module 514 may be configured to cause the ledger read operation to be executed by CPU 510. CPU 510 may be configured to perform a ledger read operation based on a read-only copy of the ledger stored at and/or maintained by CPU 514. CPU 510 may be configured to execute smart contracts based on a read-only copy of the ledger stored at and/or maintained by CPU 510. As such, only a read-only copy of the ledger is required to be accessible by CPU 510 in order to execute smart contracts and/or perform ledger read operations. Accordingly, a modifiable copy of the ledger may be moved off of, and/or located physically separate from, CPU 510.

In some implementations, configurator module 514 may be configured to generate feedback that a smart contract comprises a request to modify a copy of a ledger maintained on or by CPU 510. For example, if a smart contract comprises a request to modify (e.g., via a ledger write and update operation) a read-only copy of a ledger maintained by ledger (RO) module 516 on CPU 510, configurator module 514 may be configured to generate feedback and cause the feedback to be provided to one or more users of system 500.

In various implementations, ledger (RO) module 516 may be configured to maintain a copy of a ledger shared by a plurality of nodes on a network (e.g., network 540). In various implementations, ledger (RO) module 516 may be configured to maintain a copy of a ledger shared by a plurality of nodes on a network that may be accessed via and/or maintained by CPU 510. In various implementations, the copy of the ledger maintained by ledger (RO) module 516 may comprise a read-only copy of the ledger shared by a plurality of nodes on a network. The read-only copy of the ledger may be associated with file permissions that restrict the ability to modify the copy of the ledger by CPU 510. As such, the read-only copy of the ledger is not modifiable by the computer (or CPU 510). In various implementations, the read-only copy of the ledger may be maintained in electronic storage physically and/or communicatively coupled to CPU 510.

In various implementations, validator module 522 may be configured to process transaction verification operations in decentralized applications. For example, validator module 522 may be configured to verify the authenticity of transactions in a block, check the validity of the transactions, and/or determine whether to commit (or write) the block and the validation results onto the blockchain. In various implementations, validator module 522 may comprise a module the same as or similar to validator module 416 described herein in connection with FIG. 4. In various implementation, validator module 522 may comprise a portion and/or all of system 100 described herein in connection with FIG. 1.

In various implementations, validator module 522 may be configured to access the latched request. Based on the latched request, validator module 522 may be configured to validate at least one transaction associated with the request based on a copy of the ledger. In other words, validator module 522 may be configured to verify whether a transaction associated with the request is valid. For example, validator module 522 may be configured to compare a shadow copy of the ledger stored at and/or maintained by FPGA 520 and a transaction state for the transaction. The transaction state may be determined based on the ledger reading set for the transaction as described with respect to system 100 described herein in connection with FIG. 1. Based on the comparison, validator module 522 may be configured to determine that the transaction is valid. Responsive to a determination that the transaction is valid, validator module 522 may be configured to update the shadow copy of the ledger based on the ledger writing set and/or generate updated blocks including a record of the transaction based on the ledger writing set. In various implementations, validator module 522 may be configured to commit the validated transaction to a blockchain responsive to a determination that the transaction is valid. For example, validator module 522 may be configured to commit the validated transaction to a blockchain by committing an updated block to the blockchain responsive to a determination that the transaction is valid. In various implementations, the updated shadow copy of the ledger and/or the updated block generated responsive to a determination that the transaction is valid may be passed down main memory and stored. In various implementations, the read-only copy of the ledger accessible by CPU 510 may be modified only based on ledger write and update operations performed on FPGA 520. In various implementations, validator module 522 may be configured to update the read-only copy of the ledger responsive to a determination that the transaction is valid. For example, validator module 522 (which is located on FPGA 520) may be configured to update the read-only copy of the ledger with a validated transaction based on the ledger writing set for that transaction.

In various implementations, ledger (RW) module 524 may be configured to maintain a shadow copy of a ledger shared by a plurality of nodes on a network (e.g., network 540). For example, ledger (RW) module 524 may be configured to maintain a shadow copy of the read-only ledger maintained by ledger (RO) module 516. The shadow-copy of the ledger may be updated by FPGA 520 based on a ledger writing set. For example, responsive to a determination that a transaction is valid, the shadow copy of the ledger may be updated based on a ledger writing set associated with the transaction. The shadow copy of the ledger may contain a read-write version of the ledger that may be updated by FPGA 520, but not CPU 512. The shadow copy of the ledger may be associated with file permissions that allow FPGA 520 to modify the shadow copy of the ledger but restrict the ability of CPU 510 to modify the shadow copy of the ledger. As such, the read-only copy of the ledger is not modifiable by the computer (or CPU 510). In various implementations, FPGA 520 may be physically and/or communicatively coupled to electronic storage configured to store the shadow copy of the ledger.

In various implementations, gossip module 526 may be configured to control communication between CPU 510 and the peer-to-peer network on which a ledger is distributed (e.g., network 540). In some implementations, gossip module 526 may be configured to implement one or more communication protocols. For example, gossip module 526 may be configured to implement a gossip protocol. In various implementations, gossip module 526 may comprise a module the same as or similar to gossip module 422 described herein in connection with FIG. 4.

Because only FPGA 520 is able to modify a copy of the ledger stored and/or maintained in system 500, the endorsement phase in which smart contracts are executed cannot update or write final data in the distributed ledger. As such, the execution of smart contracts cannot modify the distributed ledger at a single node. For example, as discussed herein, a hacker may write a malicious smart contract, install it onto the system by hacking a CPU (e.g., CPU 510), and follow it with overflow or reentry attacks. In doing so, the hacker may take advantage of CPU 510 by essentially modifying the blockchain to their advantage. For example, attacking the system in this way may enable a hacker to withdraw a customer's balance, thus jeopardizing the security of the entire system. Via the decoupled computing architecture of system 500, CPU 510 may be physically removed from a modifiable copy of the ledger (i.e., the shadow copy of the ledger). The computer processing unit (e.g., CPU 510) may be configured to conduct smart contract execution separate from the modifiable copy of the ledger (i.e., the shadow copy of the ledger), and the hardware component (e.g., FPGA 520) may be configured to perform transaction verification operations that may cause the ledger to be updated. As such, the decoupled computing architecture provides added security and privacy for the system and the ledger by preventing malicious smart contracts from accessing and/or updating the modifiable copy.

As used herein, a module might be implemented utilizing any form of hardware, software, or a combination thereof. For example, one or more processors, controllers, ASICs, PLAs, PALs, CPLDs, FPGAs, logical components, software routines, or other mechanisms might be implemented to make up a module. In some implementations, the various modules described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality. Where modules are implemented in whole or in part using software, in one embodiment, these software elements can be implemented to operate with a computing or processing system capable of carrying out the functionality described with respect thereto.

Exemplary Flowcharts of Processes

Figure 6:
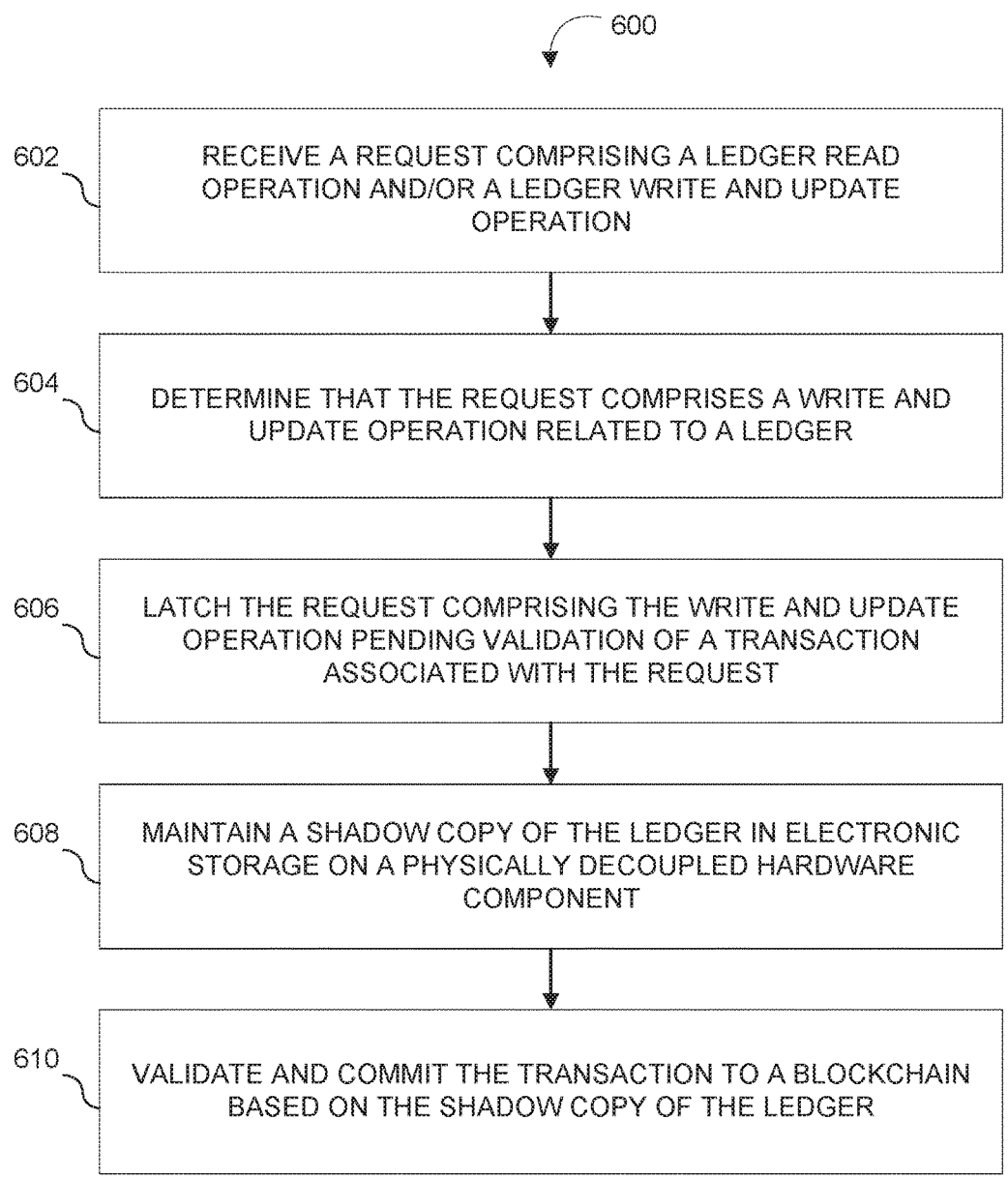
FIG. 6 depicts a flowchart of an example of a method for securely processing transaction verification operations for a decentralized application, in accordance with one or more implementations of the invention.

FIG. 6 illustrates a method 600 for securely processing transaction verification operations for a decentralized application, in accordance with one or more implementations of the invention. The operations of method 600 presented below are intended to be illustrative and, as such, should not be viewed as limiting. In some implementations, method 600 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 600 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

In some implementations, one or more operations of method 600 may be implemented via a hardware device configured to be communicatively coupled or physically attached to a component of a computer system. For example, one or more operations of method 600 may be implemented via the hardware device described above with respect to system 100. The hardware device described above with respect to system 100 may include one or more hardware components configured through firmware and/or software to be specifically designed for execution of one or more operations of method 600. In some implementations, one or more operations of method 600 may be implemented on an application specific integrated circuit (ASIC) or a field-programmable gate array (FPGA) specifically designed for execution of one or more operations of method 600.

In some implementations, one or more operations of method 600 may be implemented via one or more hardware components described with respect to system 400 or system 500. Thus, the one or more operations of method 600 may be performed by a computer processing unit (e.g., CPU 510) and/or an application specific integrated circuit (ASIC) or a field-programmable gate array (FPGA) (e.g., FPGA 520).

In an operation 602, method 600 may include receiving a request related to a ledger. For example, the request may comprise a ledger read operation related to a verified ledger and/or a ledger write and update operation related to the verified ledger. A ledger read operation may include obtaining and/or verifying a value associated with a public key in a ledger shared by nodes on a network. A ledger write and update operation may include updating the ledger by committing a transaction to the blockchain. In various implementations, a smart contract related to at least one transaction may be executed based on a read-only copy of a ledger maintained on a computer processing unit. In various implementations, the smart contract may be executed by a computer processing unit (e.g., CPU 510). The read-only copy of the ledger may comprise a read-only copy of a ledger shared by the plurality of nodes on a network. The read-only copy of the ledger may not be modified by the computer processing unit configured to execute a smart contract. Based on the execution of the smart contract, a ledger reading set and a ledger writing set may be generated. The request received may include the ledger reading set and/or the ledger writing set. In various implementations, operation 602 may be performed by a computer processing unit the same as or similar to CPU 510 (shown in FIG. 5 and described herein).

In an operation 604, method 600 may include determining whether the request comprises a ledger read operation related to the ledger or a ledger write and update operation related to the ledger. Responsive to a determination that the request comprises a ledger read operation, the ledger read operation may be performed based on the read-only copy of the ledger. For example, the ledger read operation may be performed by a computer processing unit configured to execute a smart contract. In various implementations, operation 604 may be performed by a computer processing unit the same as or similar to CPU 510 (shown in FIG. 5 and described herein).

In an operation 606, method 600 may include latching the request pending validation of at least one transaction associated with the request responsive to a determination that the request comprises a ledger write and update operation. Latching the request may prevent a computer processing unit configured to execute the smart contract from executing the request, or modifying the ledger based on a ledger writing set. For example, if the request comprises a ledger write and update operation, the request may be latched, preventing the computer processing unit (e.g., CPU 510) from modifying a copy of the ledger accessible by the computer processing unit based on the request to perform the ledger write and update operation. As such, the computer processing unit may be configured to conduct smart contract execution, while being prevented from modifying a verified version of the ledger. In various implementations, operation 606 may be performed by a computer processing unit the same as or similar to CPU 510 (shown in FIG. 5 and described herein).

In an operation 608, method 600 may include validating the at least one transaction associated with the latched request based on a shadow copy of the ledger maintained on a hardware component. In some implementations, the latched request may be accessed by a hardware component (e.g., FPGA 520) responsive to a determination that the request comprises a ledger write and update operation. The transaction may be validated by comparing a shadow copy of the ledger maintained on the hardware component against a transaction state for the transaction determined based on the ledger reading set. Responsive to a determination that the transaction is valid based on the comparison, the shadow copy of the ledger may be updated based on the ledger writing set. In various implementations, the read-only copy of the ledger may be updated as well based on the validated transaction. However, the read-only copy of the ledger may only be updated based on transaction verification by a hardware component separable from the computer on which the read-only copy of the ledger is maintained. As such, while the computer may conduct smart contract execution, a hardware component separable from the computer may perform the transaction verification operations necessary to update the verified ledger.

In an operation 610, method 600 may include committing the validated transaction to a blockchain. In various implementations, operation 610 may be performed by a hardware component the same as or similar to FPGA 520 (shown in FIG. 5 and described herein).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although illustrated in FIG. 1 as a single component, system 100 may include a plurality of individual components (e.g., computer devices) each programmed with at least some of the functions described herein. In this manner, some components of system 100 may perform some functions while other components may perform other functions, as would be appreciated.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. For example, the use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to securely process transaction verification operations for a decentralized application, the system comprising:
a computer comprising one or more physical processors communicatively coupled to electronic storage, wherein the electronic storage is configured to store a read-only copy of a ledger shared by a plurality of nodes on a network, the computer comprising at least one of the plurality of nodes, and wherein the one or more physical processors are programmed with computer program instructions that, when executed by the one or more physical processors, program the computer to:
receive a request related to the ledger;
determine whether the request comprises a ledger read operation related to the ledger or a ledger write and update operation related to the ledger;
responsive to a determination that the request comprises a ledger write and update operation, latch the request pending validation of one or more transactions associated with the request; and
a hardware component physically separate from the computer and configured to:
maintain a shadow copy of the ledger in electronic storage on the hardware component;
validate at least one of the one or more transactions associated with the latched request based on the shadow copy of the ledger; and
commit the validated at least one of the one or more transactions to a blockchain.

2. The system of claim 1, wherein the computer is further programmed to:
execute a smart contract related to a transaction of the one or more transactions based on the read-only copy of the ledger; and
generate a ledger reading set and a ledger writing set based on the execution of the smart contract.

3. The system of claim 2, wherein the request comprises the ledger reading set and the ledger writing set, wherein to validate the transaction associated with the latched request, the hardware component is further configured to:
access the latched request;
verify whether the transaction is valid based on a comparison of the shadow copy of the ledger and a transaction state for the transaction determined based on the ledger reading set; and
responsive to a determination that the transaction is valid based on the comparison, update the shadow copy of the ledger based on the ledger writing set.

4. The system of claim 1, wherein responsive to a determination that the request comprises a ledger read operation, the computer is further programmed to:
perform the ledger read operation based on the read-only copy of the ledger.

5. The system of claim 1, wherein the read-only copy of the ledger is not modifiable by the computer.

6. The system of claim 1, wherein the hardware component comprises an application specific integrated circuit (ASIC) or a field-programmable gate array (FPGA).

7. The system of claim 1, wherein the physically separate hardware component comprises a component separable from the computer, wherein the computer is configured to conduct smart contract execution, and wherein the hardware component is configured to perform transaction verification operations.

8. The system of claim 1, wherein responsive to a determination that the at least one of the one or more transactions is valid, the hardware component is configured to:
cause the read-only copy of the ledger to be updated based on the validated transaction.

9. A method of securely processing transaction verification operations for a decentralized application, the method being implemented by a computer and a hardware component physically separate from the computer, wherein the computer comprises one or more physical processors communicatively coupled to electronic storage, and wherein the electronic storage is configured to store a read-only copy of a ledger shared by a plurality of nodes on a network, the method comprising:
receiving, by the computer, a request related to a ledger;
determining, by the computer, whether the request comprises a ledger read operation related to the ledger or a ledger write and update operation related to the ledger;
responsive to a determination that the request comprises a ledger write and update operation, latching the request pending validation of one or more transactions associated with the request;
validating, by the hardware component, at least one of the one or more transactions associated with the latched request based on a shadow copy of the ledger maintained on the hardware component; and
committing, by the hardware component, the validated at least one of the one or more transactions to a blockchain.

10. The method of claim 9, the method further comprising:
executing, by the computer, a smart contract related to a transaction of the one or more transactions based on the read-only copy of the ledger; and
generating, by the computer, a ledger reading set and a ledger writing set based on the execution of the smart contract.

11. The method of claim 10, wherein the request comprises the ledger reading set and the ledger writing set, and wherein validating the transaction associated with the latched request comprises:
accessing, by the hardware component, the latched request;
verifying, by the hardware component, whether the transaction is valid based on a comparison of the shadow copy of the ledger and a transaction state for the transaction determined based on the ledger reading set; and
responsive to a determination that the transaction is valid based on the comparison, updating, by the hardware component, the shadow copy of the ledger based on the ledger writing set.

12. The method of claim 9, wherein responsive to a determination that the request comprises a ledger read operation, the method further comprises:
performing, by the computer, the ledger read operation based on the read-only copy of the ledger.

13. The method of claim 9, wherein the read-only copy of the ledger is not modifiable by the computer.

14. The method of claim 9, wherein the hardware component comprises an application specific integrated circuit (ASIC) or a field-programmable gate array (FPGA).

15. The method of claim 9, wherein the physically separate hardware component comprises a component separable from the computer, the method comprising:
   conducting, by the computer, smart contract execution; and
   performing, by the hardware component, transaction verification operations.

16. The method of claim 9, wherein responsive to a determination that the at least one of the one or more transactions is valid, the method further comprises:
   causing, by the hardware component, the read-only copy of the ledger to be updated based on the validated transaction.

17. A hardware component configured to securely process transaction verification operations for a decentralized application, wherein the hardware component is physically separate from a computer, and wherein the hardware component is configured to:
   maintain a shadow copy of a ledger shared by a plurality of nodes on a network in electronic storage on the hardware component, wherein the shadow copy of the ledger is not modifiable by the computer;
   receive a block comprising at least one transaction from the computer, wherein the block includes a ledger reading set and a ledger writing set generated by the computer based on a read-only copy of the ledger stored on the computer and execution of a smart contract associated with the at least one transaction; and
   validate the at least one transaction based on the shadow copy of the ledger.

18. The hardware component of claim 17, wherein to validate the at least one transaction based on the shadow copy of the ledger, the hardware component is configured to:
   determine a transaction state for the at least one transaction based on the ledger reading set;
   compare the transaction state for the at least one transaction to the shadow copy of the ledger; and
   responsive to a determination that the at least one transaction is valid based on the comparison, update the shadow copy of the ledger based on the ledger writing set and commit the block to a blockchain.

19. A method of securely processing transaction verification operations for a decentralized application, the method being implemented by a hardware component physically separate from a computer, the method comprising:
   maintaining, by the hardware component, a shadow copy of a ledger shared by a plurality of nodes on a network in electronic storage on the hardware component, wherein the shadow copy of the ledger is not modifiable by the computer;
   receiving, by the hardware component, a block comprising at least one transaction from the computer, wherein the block includes a ledger reading set and a ledger writing set generated by the computer based on a read-only copy of the ledger stored on the computer and execution of a smart contract associated with the at least one transaction; and
   validating, by the hardware component, the at least one transaction based on the shadow copy of the ledger.

20. The method of claim 19, wherein validating the at least one transaction based on the shadow copy of the ledger comprises:
   determining, by the hardware component, a transaction state for the at least one transaction based on the ledger reading set;
   comparing, by the hardware component, the transaction state for the at least one transaction to the shadow copy of the ledger; and
   responsive to a determination that the at least one transaction is valid based on the comparison, updating, by the hardware component, the shadow copy of the ledger based on the ledger writing set and committing the block to a blockchain.

* * * * *